United States Patent
Moore

(10) Patent No.: US 6,748,519 B1
(45) Date of Patent: Jun. 8, 2004

(54) METHOD AND APPARATUS FOR UTILIZING RENAMED REGISTERS BASED UPON A FUNCTIONAL OR DEFECTIVE OPERATIONAL STATUS OF THE REGISTER

(75) Inventor: Charles Roberts Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/594,627

(22) Filed: Jun. 15, 2000

(51) Int. Cl.[7] .......................... G06F 15/00; G06F 11/00

(52) U.S. Cl. .......................... 712/217; 714/7; 714/710; 365/201

(58) Field of Search .............. 714/6, 8, 42, 7, 714/710; 712/217; 365/1, 200, 201

(56) References Cited

U.S. PATENT DOCUMENTS

| | | | | | |
|---|---|---|---|---|---|
| 4,093,985 | A | * | 6/1978 | Das ................................. | 714/5 |
| 4,584,673 | A | * | 4/1986 | Kuijk ........................... | 365/219 |
| 4,819,205 | A | * | 4/1989 | McRoberts ..................... | 365/1 |
| 5,005,158 | A | * | 4/1991 | McClure et al. ............. | 365/200 |
| 5,038,368 | A | * | 8/1991 | Lee .............................. | 377/28 |
| 5,392,292 | A | * | 2/1995 | Davis et al. .................... | 714/7 |
| 6,405,304 | B1 | * | 6/2002 | Farrell et al. ................ | 712/216 |

OTHER PUBLICATIONS

Hennessy and Patterson, Computer Architecture—A Quantitative Approach, 2nd Edition, 1996, pp. 251–258.*

* cited by examiner

Primary Examiner—Eddie Chan
Assistant Examiner—David J. Huisman
(74) Attorney, Agent, or Firm—Mark E. McBurney

(57) ABSTRACT

The present invention is a mechanism for providing redundancy in the register file of a microprocessor such that registers having a defective operational status, as determined by testing, can be tolerated and the baseline specification of the microprocessor can be met. The present invention utilizes the register renaming capability of a microprocessor to allow additional registers, above those called for in the specification to be provided. The registers are then tested and those found "bad" are identified and avoided by the allocation/deallocation logic, which is used to assign registers to the various instructions being executed by the microprocessor. More particularly, the present invention maintains a list of physical registers in a register file that have a functional operational status and are available to be allocated to various instructions as they execute. The allocated registers are typically used to store interim data resulting from the execution of the assigned instruction. When the data in the rename register is complete it is then committed to the architecture by rewriting the results to an architected register. The present invention uses this rename capability to prevent a defective register that was manufactured bad to ever be included in the list of registers that are available for allocation to the processor instructions.

23 Claims, 4 Drawing Sheets

METHOD AND APPARATUS FOR UTILIZING RENAMED REGISTERS BASED UPON A FUNCTIONAL OR DEFECTIVE OPERATIONAL STATUS OF THE REGISTER

CROSS REFERENCE TO RELATED APPLICATIONS

U.S. patent application entitled "Microprocessor Instruction Buffer Redundancy Scheme", having Ser. No. 09/594,632, filed on Jun. 15, 2000, and assigned to the assignee of the present invention.

BACKGROUND OF THE INVENTION

1. Field of the Invention

The present invention relates to improving manufacturing yield for microprocessor chips by providing redundant registers and accurately identifying those registers which are available for use. More particularly, the present invention includes a sparing technique that tests the register file circuitry and stores the results of these tests in order to ensure that a sufficient number of registers are available to meet the baseline specification of the microprocessor.

2. Description of Related Art

With the continual advance of computer technology, more and more circuitry is being provided on each integrated circuit (IC), which makes them correspondingly more complex. These chips are likely to include millions of transistors and be quite large. It is not surprising that the cost to fabricate these ICs is relatively high and, as the cost increases, the manufacturing yield becomes critical in order for producers of these chips to remain competitive.

Manufacturing yield is essentially the percentage of ICs that meet the design specification relative to the total number of chips produced. Of course, as chip complexity and size increases, the manufacturing yield usually decreases. Further, after a new IC design has been manufactured for a significant period of time, per chip costs often decrease as the fabrication process is tuned and optimized. Thus, in order to stay competitive it is often necessary, if not critical, to increase manufacturing yields especially during the early stages of chip production when the manufacturing costs are highest.

It can be seen that yield on large chips is an important issue and techniques for tolerating small numbers of random defects in the manufacturing process are increasingly more important. While the use of redundancy in caches has been used for some time, it has not been used for other structures in microprocessors. In particular, redundancy has not been used in the microprocessor register file circuitry that is common in microprocessors and whose area contribution is growing due to the expanded use of register renaming. Further, the contribution of the register file and instruction buffer to the overall core area of modern microprocessors is increasing to the point where both of these structures can make up approximately ten percent (10%) of the microprocessor core for a total of about 20% of the core area and core functionality. This illustrates the importance in terms of complexity and size of just two microprocessor core structures where redundancy can be used in accordance with the present invention to improve performance.

In a microprocessor with renamed registers, the machine automatically maps the architecturally defined set of "logical registers" into a larger set of "physical registers" to avoid various types of false dependencies and to allow easy purging or speculative results when necessary. As instructions are processed and registers are needed, register allocation/deallocation logic examines the state of the physical register pool, and selects a register that is currently not active, and then marks it as "in use". Later, when the instruction is either completed (or purged), the register deallocation logic frees the register again for future use.

More particularly, most modern microprocessors use rename buffers, or registers. It should be noted that the terms "rename registers" and "rename buffers" will be used interchangeably herein. These rename buffers act as temporary storage for instructions that have not completed and as write-back buffers for those that have. To avoid contention for a given register location rename registers are provided for storing instruction results before they are completed and committed to the architected registers. For example, a microprocessor ray include thirty-two, thirty-two bit general purpose registers (GPRs) which are considered architected registers and twelve, thirty-two bit rename registers for holding results prior to their commitment to the architected registers. Further, rename registers may also be provided for other architected registers, such as two rename buffers for the floating point registers (FPR) and eight rename buffers for the condition register (CR).

Generally, when the dispatch unit provides an instruction to the appropriate execution unit (i.e. the integer unit (IU), floating point unit (FPU), load/store unit (L/S), or the like), it allocates a rename register for the results of that instruction. The dispatch unit also provides a tag to the execution unit identifying the result that should be used as the operand. When the proper result is returned to the rename buffer it is provided to the execution unit, which begins execution of the instruction. Instruction results are not transferred from the rename registers to the architected registers until any speculative branch conditions are resolved and the instruction itself is retired without exceptions. If a speculatively executed branch is found to have been incorrectly predicted, the speculatively executed instructions following the branch are flushed and the results of those instructions are flushed from the rename registers.

As an example, conventional microprocessors avoid contention for a given register file location, and in the course of out-of-order execution, by providing rename registers for the storage of instruction results prior to their commitment (in program order) by the completion unit to the architecturally defined registers. Register renaming minimizes architectural resource dependencies, namely the output and anti dependencies, that would otherwise limit opportunities for out-of-order execution.

A GPR rename buffer entry is allocated when an instruction that modifies a GPR is dispatched. This entry is marked as allocated but not valid. When the instruction executes, it writes its results to the entry and sets the valid bit. When the instruction completes, its result is copied from the rename buffer entry to the GPR and the entry is freed for reallocation. For load with update instructions that modify two GPRs, one for load data and another for address, two rename buffer entries are allocated.

An instruction that modifies a GPR is assigned a position in the GPR rename register file. Load with update instructions get two positions since they update two registers. When the GPR rename buffer is full, the dispatch unit stalls when it encounters the first instructions that need an entry. A rename buffer entry becomes available in one cycle after the result is written to the GPR.

Operation of rename buffers that may be associated with other register files such as the floating point register file, condition register file, and the like function in a similar manner.

Redundancy and sparing are methods that are known in the art. These techniques supply additional circuit elements, beyond those required for the baseline specification of the IC, to act as spares in the event that certain ones of the original elements prove to be defective.

The use of redundancy in caches has been common for some time, but due to complexity and cycle time considerations has not been used for other structures in microprocessors. The present invention relates to providing redundancy in register file circuitry which, due in part to register renaming, is becoming a larger portion of the microprocessor core in terms of physical area and importance.

Typically, with cache redundancy, fuses are provided that are associated with each cache line. As the cache is tested, those fuses associated with lines that test bad can be blown, or opened, and the array access decoder circuitry is modified to note the state of these fuses. The decoder circuitry then "decodes around" any bad entries by recognizing an address to a bad cache line and substituting a functional cache line, while maintaining a record of this substitution. The problem with this traditional scheme is that a significant amount of complexity is required in the cache array circuitry provide the address substitution and tracking mechanism. This is undesirable not only in the amount of additional logic circuitry that is required to be implemented in the chip, but also in the amount of cycle time that is required. More particularly, each time the processor tries to access the portion of the cache that tested bad, decode logic must identify the request as being to the bad address and provide a substitute address to a spare cache location where the data can be stored. This decoding and address substitution occurs continuously during the operation of the data processing system. Thus, it can be seen that a significant amount of cycle time can be consumed over and over during system operations as access attempts to bad cache locations are continually processed.

In a microprocessor core, the register file circuitry is usually considered a critical path which is very sensitive to cycle time pressure. Thus, the conventional cache redundancy decode scheme cannot be applied to a register file circuitry environment and will not solve the problem addressed by the present invention which provides redundant registers without adding significant complexity or negatively impacting cycle time.

Therefore, it can be seen that a need exists for a mechanism that supports redundant microprocessor registers to allow the baseline specification to be met, even when some of the registers may not be functional, and to allow the control of these registers without adding additional complexity or cycle time pressures to the system.

SUMMARY OF THE INVENTION

In contrast to the prior art, the present invention is a mechanism for providing redundancy in the register file of a microprocessor such that registers which test bad during manufacturing can be tolerated and the baseline specification of the microprocessor can be met.

Broadly, the present invention utilizes the renaming capability of a microprocessor to allow additional registers, above those called for in the specification to be provided. The registers are then tested and those found "bad" are identified and avoided by the allocation/deallocation logic, which is used to assign registers to the various instructions being executed by the microprocessor.

More particularly, the present invention maintains a list of registers that are available to be allocated to various instructions as they execute. The allocated registers are typically used to store interim data resulting from the execution of the assigned instruction. When the data in the rename register is complete it is then committed to the architecture by rewriting the results to an architected register. The present invention uses this rename capability to prevent a register that was manufactured bad to ever be included in the list of registers that are available for allocation to the processor instructions. In this manner redundant or spare registers, above the baseline specification of the microprocessor, can be provided to account for any faulty registers that are present due to a less than 100% manufacturing yield. By using existing logic to prevent those registers that test bad from ever being used, a register file meeting the microprocessor specification is ensured, without the addition of costly and complex control logic, or requiring sorting of the chips to find those which happen to have been manufactured with register file that comply with the specification.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
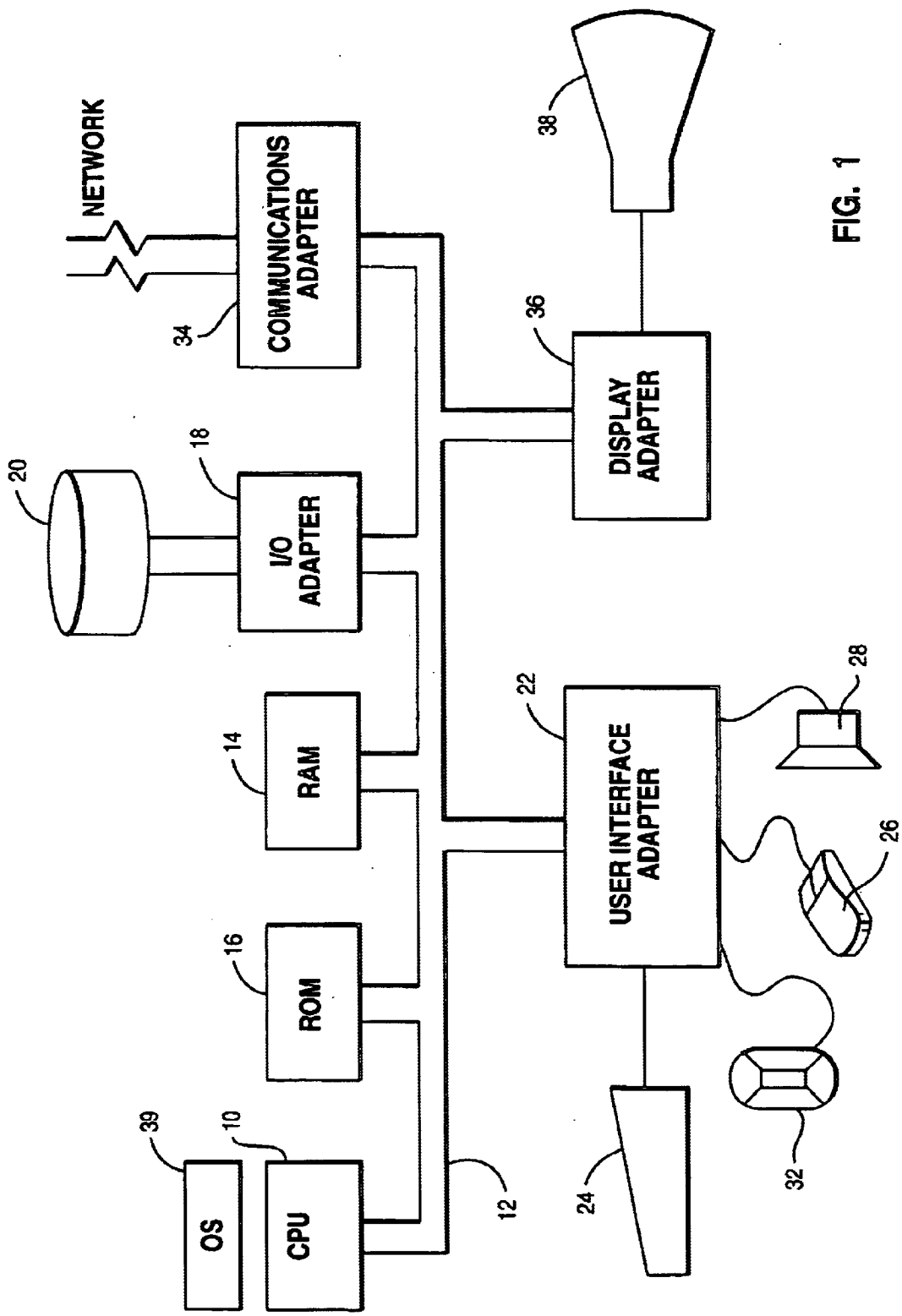
FIG. 1 is a block diagram of an overall computer system that may include a microprocessor capable of implementing the register redundancy scheme of the present invention.

Referring to FIG. 1, a typical data processing system is shown which may be used in conjunction with the present invention. A central processing unit (CPU) 10 may include a PowerPC microprocessor, commercially available from the IBM Corporation or a Pentium class microprocessor, available from Intel Corporation interconnected to the various other system components by a system bus 12. Read only memory (ROM) 16 is connected to CPU 10 via bus 12 and includes the basic input/output system (BIOS) that controls the basic computer functions. Random access memory (RAM) 14, I/O adapter 18 and communication adapter 34 are also connected to system bus 12. I/O adapter 18 may be a small computer system interface (SCSI) adapter that communicates with a disk storage device 20. Communications adapter 34 may be a network card that interconnects bus 12 with an outside network. Adapter 34 may also include an I/O port that allows a connection to be made to enable the data processing system to communicate with other such systems via the internet, or other communications network (LAN, WAN). User input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a use is capable of inputting to the system through keyboard 24, trackball 32 or mouse 26 and receiving output from the system via speaker 28 and display 38. Additionally, an operating system (OS) 39, such as the DOS, OS/2, Windows operating system, or the like is shown running on CPU 10 and used to coordinate the functions of the various components shown in FIG. 1.

Figure 2:
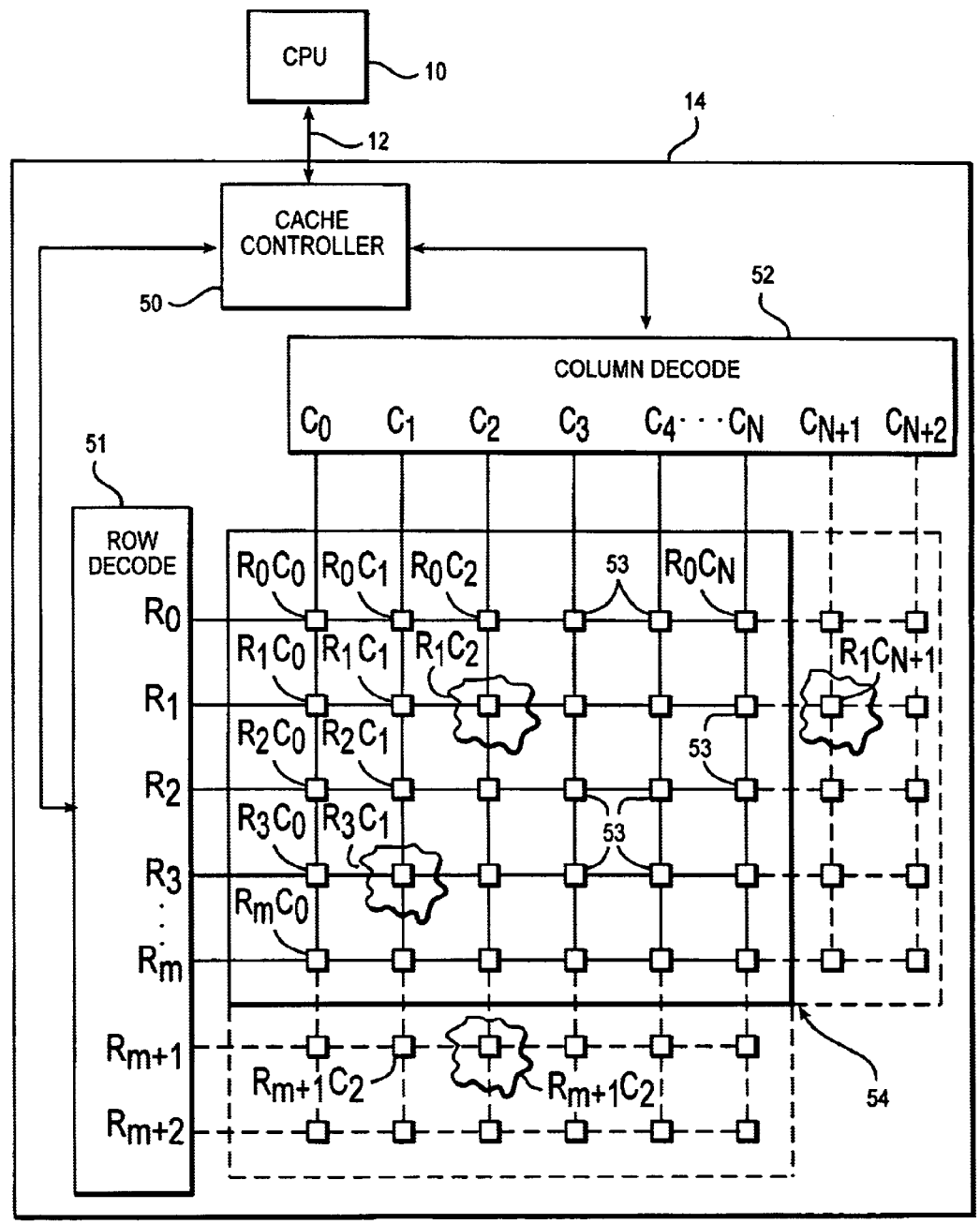
FIG. 2 is another block diagram of a prior art cache redundancy system to be contrasted with the register redundancy of the present invention.

Referring to FIG. 2 a block diagram is provided that illustrates an example of redundancy as used in a cache memory system. Traditional cache redundancy schemes rely on index-based decoder circuitry to steer around bad rows/columns in the cache. The register file is used in a different manner, as it is controlled by the register rename logic and as such is distinguished from the traditional cache redundancy scheme. Bus 12 connects central processing unit 10 to a cache controller 50 which, for the purposes of this description is considered as included in RAM 14 shown in FIG. 1. Cache controller 50 includes a directory, associated tags and comparator that determine, among other things, when data is present in a cache memory array 54. That is, cache controller 50 determines whether a cache "hit" (data is present in the cache) or "miss" (data is not present in the cache) occurs. Further, cache controller 50 will control all accesses to cache memory array 54 by CPU 10 or another bus master device connected to system bus 12. Cache accesses will include read operations which retrieve data from array 54 that is to be processed and write operations that place data into the cache for future use.

Cache memory array 54 is depicted as an array of storage elements 53 which maintain the state of a binary value, i.e. a logical 1 (voltage) or a logical 0 (ground, or reference potential). Various types of circuits can be used to store these values, including two inverters each having their outputs connected to the input of the other inverter, capacitors that store a charge and maintain a voltage thereacross, or the like. These storage elements store one bit of data and are configured in an array of multiples rows and columns. The rows of storage elements will combine to form data bytes, words, double words, quad words, and the like. Each bit of data in a row is accessed by identifying its position in the array through a row access identifier and column access identifier. For purposes of explanation, each column position may be C0, C1, C2, C3 ... Cn and each row position may be R0, R1, R2, R3 ... Rm. Therefore, each storage element 53 will have a defined location in the array 54. For example, the leftmost storage element in the top row will be at location R0C0 while the storage element in the second column from the left in the third row from the top will be at R2C1, and so forth. It should be noted that FIG. 2 shows an array with a variable number of columns and rows since the size of cache arrays used can vary greatly.

To obtain data from the cache memory, CPU 10 will send a read request, or the like, to cache controller 50 including an address corresponding to the requested data. Cache controller 50 must then determine the physical location in array 54 where the requested data is located. A decoding operation then occurs wherein the read request is decoded by row decode unit 51 and column decode unit 52 to determine the coordinates in array 54 where the requested data is located.

For example, when CPU 10 requires a certain byte of data, it may request the byte stored at, for example, the storage elements located in array 54 at locations R1C0, R1C1 ... R1C7 to obtain this information. In order to obtain this information, row decode unit 51 determined from the read request that the requested byte was somewhere in row 1, and column decode 52 determined that the byte was located in the first 8 columns of the array, i.e. columns 0–7. Combining this information it can be seen that the requested byte is in the first 8 columns of the second row of array 54.

However, during manufacturing of the integrated circuit device which includes array 54, defects often occur that can cause storage elements 53 not to function properly. To account for this manufacturability problem redundant rows and columns of storage elements are often included in a cache memory array 54.

FIG. 2 shows two additional columns (n+1, n+2) and two additional rows (m+1, m+2) included for redundancy. Of course, the number of extra columns and rows can vary depending on such factors as the size of the cache, implementation, manufacturing process, and the like.

Continuing with the previous example, if one or more of the storage elements 53 have tested "bad" during manufacturing testing, then a storage element from one of the redundant columns and/or rows must be used. For purposes of discussion, it is assumed that the storage element in the third column of the second row is bad, i.e. R1C2. Thus, a redundant, or spare storage element will need to be utilized to store the bit of information that would be present at this location. At spare storage element, Rm+1, C2 could be used to store this data. Thus, every time a transaction is issued from CPU 10 (or another busmaster device that attempts to access the storage element at R1C2) row decode logic 51 will cause the transaction address to be interpreted as row Rm+1 for the bit of data that would have been stored at R1C2. That is, the transaction address will be decoded to include Rm+1, C2 on each occasion when the storage element 53 at location R1C2 is called for by the transaction. It should be noted that the system will continually attempt to access location R1C2 and each time, row decode logic 51 will have to map the request to the redundant location, Rm+1, C2.

This increased cycle time for a cache access will also occur when column redundancy is used. For example, if the spare storage element at R1, Cn+1 is used to store the bit of data that would have been located at R1C2, then column decode 52 will have to decode every access attempt to row R1, C0–C7 to substitute R1, Cn+1 for R1C2. Again an unacceptably high increase in cycle time will occur since the decode logic must interpret all cache access transaction to actually include the redundant location, i.e. R1, Cn+1. It also should be noted that attempts to access storage elements at a given cache location will occur very frequently and cause the decode logic to direct the transaction to the "good" storage elements for each attempt. Thus, the performance is continually impacted for each cache access attempt to a particular storage element.

It can be seen that this continuous substitution will cause a significant amount of cycle time to be added to the cache access time for every attempt to access data that is logically stored to a "bad" storage element. Further, those skilled in the art will understand that while this type of redundancy may be acceptable for cache access, it is totally unacceptable to introduce this additional cycle time into the critical path of a microprocessor. Thus, for this and other reasons, continual re-decoding of cache access attempts to use redundant rows/columns in a cache array is not a viable solution for providing redundancy for data storage devices, e.g. buffers, registers and the like, which are in the critical path of a microprocessor.

Figure 3:
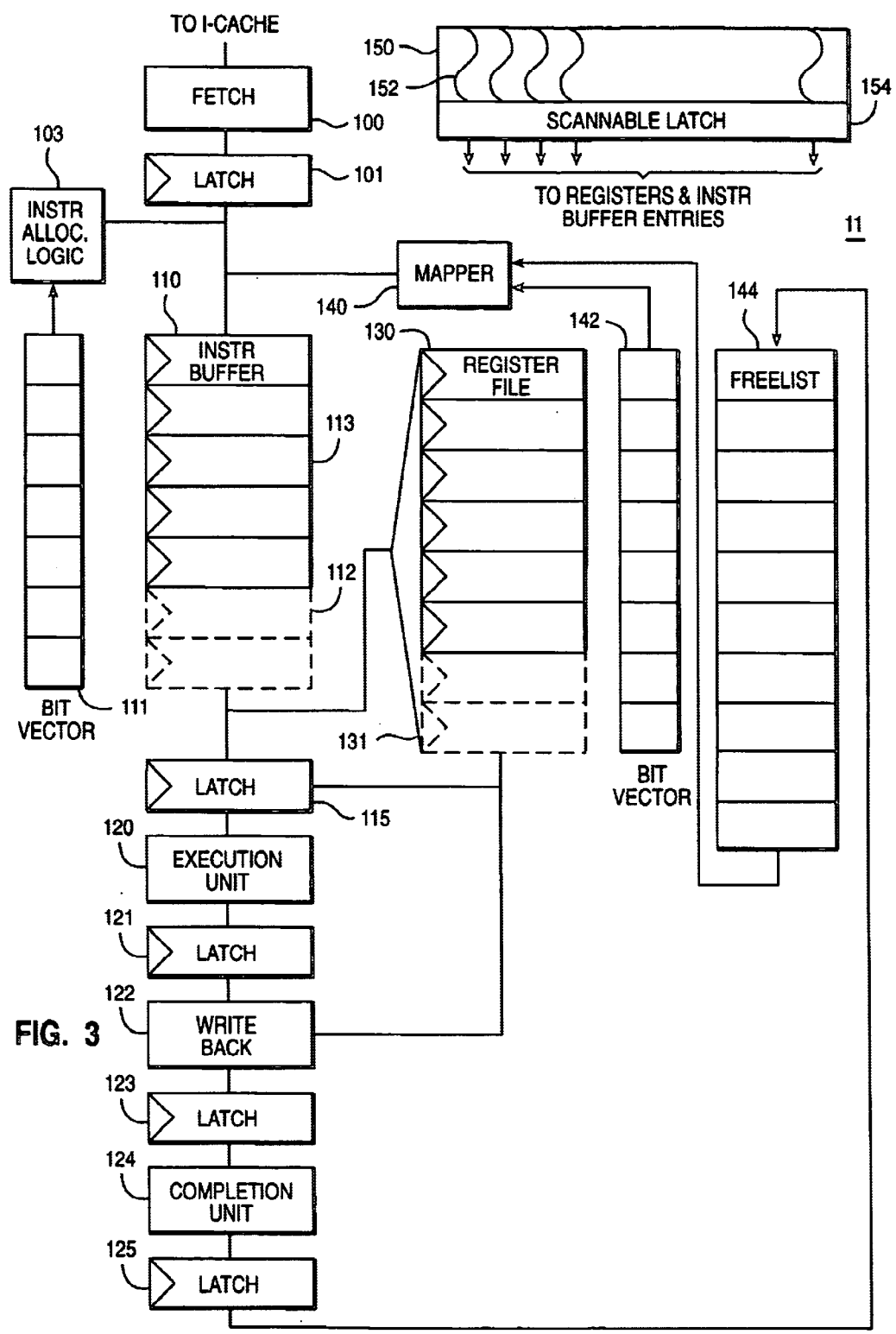
FIG. 3 represents the elements of a microprocessor which implements the redundant registers of the present invention.

Referring to FIG. 3, a block diagram of a microprocessor 11 that is capable of implementing the novel redundancy scheme of the present invention is shown. Microprocessor as used herein will refer to the basic instruction processing and execution unit and can be considered a subset of a CPU which may include additional data processing functions, e.g.

I/O. Register renaming is a technique that is relatively common in many of today's speculative, out of order microprocessors. For example, the PowerPC 604 microprocessor (commercially available from IBM), as well as the Pentium II microprocessor from the Intel Corp. are examples of processors that utilize register renaming.

Basically, register renilung operates to build operand data into a mapper 140 that is a portion of the overall renaming logic. The mapper then keeps track of the logical register set and its correspondence to the physical register file. For example, a certain microprocessor may include 32 architected registers in the general purpose register (GPR) file, each of which is 32 bits wide, and twelve 32-bit rename registers. These registers make up the logical general purpose register set for this processor. Thus, the base line specification for this processor calls for 32 architecturally defined general purpose registers and 12 rename registers. This number of registers will be needed for this particular microprocessor to meet its intended design criteria. It can be seen that for this implementation 44 physical registers will be needed to account for the GPRs and rename registers. However, as smaller line widths become more and more prevalent, manufacturing yield is likely to decrease and place greater importance on redundancy techniques. Thus with no redundancy mechanism, conventional designs must rely on manufacturing processes to ensure that 100% of the physical registers are functional in order to meet the design specification. Therefore, it can be seen that an advantage is provided if a number of extra registers are supplied and managed to compensate for any registers that test bad during post manufacturing testing. In accordance with the present invention a pool of physical registers is provided that will include both architected registers that are recognized by the software, as well as rename registers. Mapper 140 will operate to control the allocation of physical registers for use as either architected or rename registers in accordance with the microprocessor design specification.

Referring again to FIG. 3, a fetch unit 100 is shown that will retrieve the microprocessor instructions to be executed from an instruction cache, or the like (not shown). The fetched instructions are then latched into latch 101 prior to entering the decode/dispatch stage. Instruction buffer 110 is then provided to store the instructions during this decode and dispatch process and prior to their issuance to the microprocessor execution units. It can be seen that instruction buffer 110 includes buffer entries 113 and multiple redundant buffer entries 112.

Further, bit vector 111 is shown in FIG. 3 which is used to provide an indication of the state of each entry 113 in buffer 110. That is, a bit is provided which corresponds to each entry 113 to indicate whether that entry was tested "good". More particularly, a manufacturing test can be performed which will determine if the entry will store the correct instructions and data. If so, the corresponding bit will be a logical 0, while an entry which tests bad will be designated by the corresponding bit in vector 111 by a logical 1. Of course those skilled in the art will understand how a logical "1" could be used to designate "good" bits with a logical "0" corresponding to bits which test "bad".

Manufacturing tests are well known and will not be described in detail herein. Basically, one type of test logic that may be used in conjunction with the present invention generates a pattern of binary values (1's and 0's) and writes the pattern to the storage location being tested. The pattern is then read back and compared to the generated pattern. If the retrieved pattern matches the generated pattern, then the storage location will be considered functional or "good" operational status and the logical 0 will remain in the corresponding bit. However, if the patterns do not match, the corresponding bit will be set to a logical 1, indicating that the entry has tested defective, or "bad".

Instruction allocation logic 103 is also shown in FIG. 3 and is used by microprocessor 11 to assign the fetched instructions to one of the multiple entries 113 in instruction buffer 110. Once the bit vector is generated, it is provided to instruction allocation logic 103. In this manner, the fetched instruction can be allocated to only those entries 113 which have tested "good" as indicated by, for example, a corresponding "0" in bit vector 111. This enables spare, or redundant entries 112 to be considered for use by allocation logic 103. Therefore, should one of the entries 113 that make up the microprocessor baseline specification test "bad", then allocation logic 103 can assign the fetched instruction to a redundant entry 112 which has tested "good". Thus, redundant instruction buffer entries can be introduced to the microprocessor design at a critical path without any performance degradation.

Continuing with FIG. 3, register file 130 is shown as being coupled with instruction buffer 110, latch 115 and write back unit 122. Redundant registers are also included and shown by reference numeral 131. For purposes of this discussion, it should be understood that register file 130 will include both rename registers and general purpose registers. While a specific number of registers are shown in FIG. 3, those skilled in the art will understand that many different configurations of register files are possible, including general purpose registers files including 80 or more logical registers.

Mapper 140 is also shown and includes register allocate/deallocate logic that matches instructions with available registers in register file 130. Freelist 144 is provided and operates in conjunction with the register allocate/deallocate logic of mapper 140 and maintains a list of registers that are available for use, i.e. to be matched with a fetched instruction.

Once fetched and decoded, the instructions are provided to latch 115 in the execute stage. During the decode stage it is determined what type of instruction is to be executed, which will govern whether the instruction should be provided to a particular execution unit. For example, modem microprocessors normally include multiple execution units, such as an integer unit, floating point unit, load/store unit, branch processing unit, or the like. In this manner, a floating point ADD instruction will be provided to the floating point unit, a COMPARE instruction will normally be provided to the integer unit, and so forth. These instructions will normally require data to complete their operation. This data will usually be provided from the register file 130, after having been placed in a particular register by execution of a previous instruction or during the write back stage.

After execution of the instruction by unit 120, the results are placed in latch 121 for entry to the write back stage. Write back occurs when a result is written from the rename registers into the architectural registers (GPRs). Results are written back at completion time or are moved into the write-back buffer. Write back unit 122 will provide results back to the designated rename registers in register file 130 so that these results can then be used as data operands for subsequent instructions.

The complete stage maintains the correct architectural machine state. Essentially the complete stage ensures that executed instructions are retired in the same order in which they were dispatched. Modem microprocessors are generally capable of executing instructions out of order. However, once executed they are placed back in their sequential order to maintain program consistency. A completion unit 124 is provided that generally includes a completion buffer and associated logic that compares the program number of the results of the executed instructions and places the results in sequential order in the buffer, prior to the results being written back and committed to the architecture. Latch 123 is used to store the results prior to entering the complete stage. Subsequent to completion, the register allocated to the instruction that was executed is released and added to freelist 144 as one that is available for allocation to another instruction being processed. The register address latched into latch 125 prior to being added to freelist 144. Freelist 144 receives the location of available physical registers from completion unit 124 after the results from these registers are committed to the architecture. A first-in-first-out algorithm, or the like is then be used to maintain the registers available for allocation in freelist 144. When the available registers are ready to be allocated their address is provided to mapper 140 for assignment to the next instruction being dispatched as a destination register for associated operand data.

Modern microprocessors may avoid contention for a given register location by providing rename registers for storing instruction results before the completion unit commits them to the architected register(s), i.e. the 32 general purpose registers. When the dispatch unit dispatches an instruction to its execution unit, it allocates a rename register for the results of that instruction. The dispatch unit also provides a tag to the execution unit identifying the result that should be used as the operand. When the proper result is returned to the rename buffer it is latched into the reservation station (buffer between dispatch and execute stages). When all operands are available in the reservation station, execution can begin. The completion unit does not transfer instruction results from the rename registers to the architected registers until any preceding speculative branch conditions in the completion queue are resolved and the instruction itself is retired from the completion queue without exceptions. If a speculatively executed branch is found to have been incorrectly predicted, the speculatively executed instructions following the branch are flushed from the completion queue and the results of those instructions are flushed from the rename registers.

For an in depth discussion of register renaming see chapter 7.5 of Advanced Computer Architectures: A Design Space Approach, Sima, Fountain, Kacsuk, Addison-Wesley Longman, 1997, the entire text of which is hereby incorporated by reference.

In accordance with the present invention a mechanism is provided for determining which ones, if any, of the registers in register file 130 test bad during manufacturing testing. Referring again to FIG. 3, in a preferred embodiment, electronic fuses 152 are wired to a test port 150 and connected to scannable latch 154. During manufacturing (or other) testing if a register in file 130 tests bad, then the corresponding fuse can be blown and an associated bit set in scannable latch 154. Thus, an indicator is provided for each register that is determined to be defective during testing. Of course, there are many different ways that the indicator bit can be created. For example, during power on self test (POST) it can be determined if each register is operating correctly. Also, other test mechanisms are available which can be used to generate bit vector 142 or provide another type of indicator regarding the operability of a register. For example, a built in self test (BIST) routine can be used to determine which ones of the registers in register file 130 are bad and set a corresponding bit that can be used as an indicator. That is, data can be written to the register(s) being tested and then checked for accuracy when it is read back. If any discrepancies are found in a particular register, an associated bit can be set to identify that particular register as testing bad. Once the registers that test bad are identified, a bit vector 142 can be generated having entries that correspond to each register in register file 130. This information can then be provided to mapper 140 and used to allocate only functional registers in file 130 to instructions during dispatch such that the registers which tested bad are never considered for allocation.

Thus, it can be seen that the present invention essentially operates to build a list of registers which are available for allocation. Once this list is built, there are no additional re-decoding activities, register reassignment procedures, or the like to be implemented beyond the register allocation that normally occurs during renaming operations.

Figure 4:
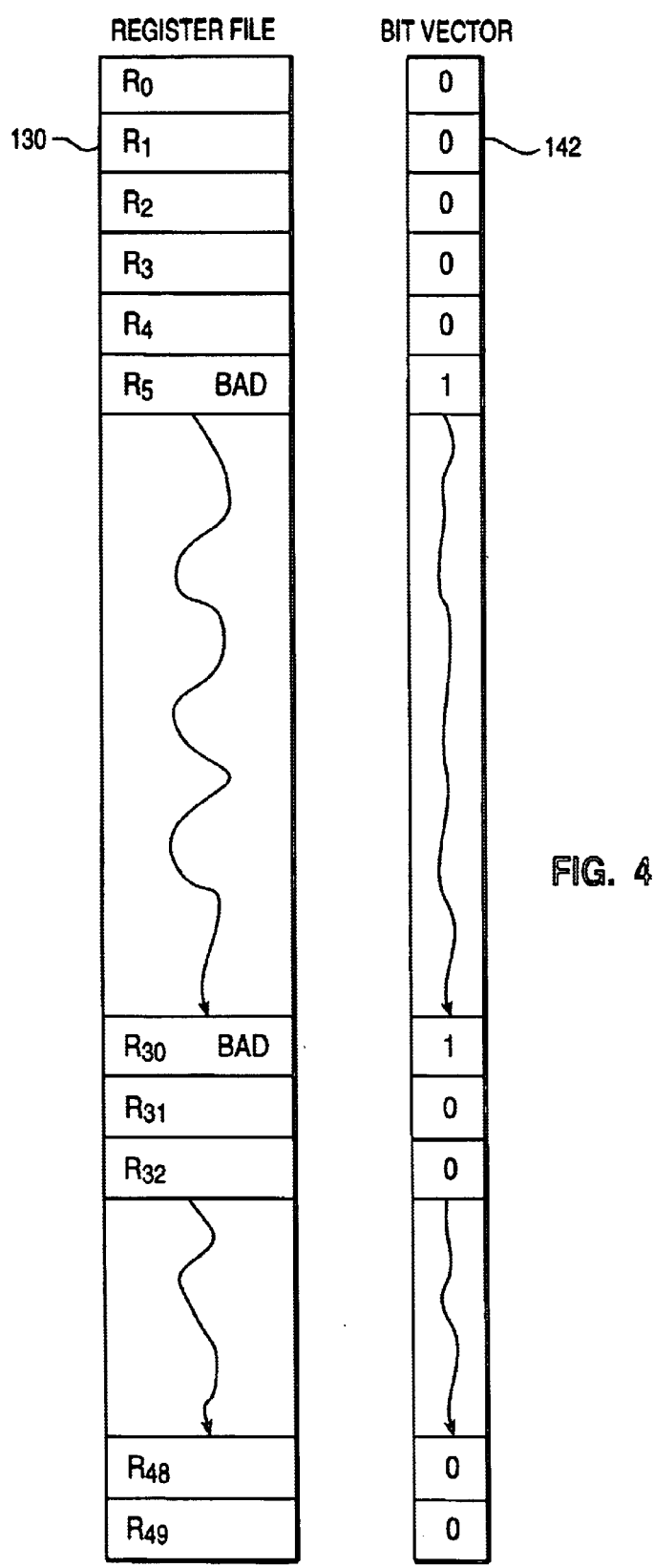
FIG. 4 shows a physical register pool that includes the architected, or logical, registers, as well as the rename registers for a particular microprocessor.

Referring to FIG. 4, as well as FIG. 3, an example of register renaming will now be provided. For purposes- of this example the following instruction sequence will be used:

(1) ADD1 R31<R0, R1

(2) ADD2 R20<R31, R0

(3) ADD3 R31<R2, R3

The first instruction adds the contents of register R0 and register R1 and places the result in register R31. When the ADD1 instruction is dispatched, mapper 140 will select the next available physical register from freelist 144 and map the logical destination register R31 to this physical register. For the purposes of this example, it will be assumed that the allocated physical register is R49 from FIG. 4. Normally, a mapping table is set up to track the allocation of physical registers to logical registers. For more details see Figures. 7.52 and 7.53 on page 252 of the "Sima, et al" Advanced Computer Architectures text. Next, the ADD2 instruction places the sum of registers R31 (R49 physical register) and R0 in register R20. Thus, it can be seen that the operand data from instruction (1) is still being utilized such that physical register R49 remains allocated as the destination register of instruction (1). It should be noted that there are normally two conditions which must be met in order for a register to be deallocated. First, the assigned physical register must have another value written to it, i.e. the data that was the result of the assigned instruction is no longer present in the register; and second, there are no previous instructions that are using that value, i.e. no previously dispatched instructions are using the data stored in the registers by the assigned instruction. In this manner the allocate logic uses the assigned register for the life of the value originally placed therein. The register is allocated when first needed as a target destination for holding intermediate results and deallocated when the logical (architected) register is reused, i.e. a different value for another instruction is stored to the same logical register.

In the context of the present example, physical register R49 is allocated by the dispatch unit as the destination (rename) register for the operand data of instruction (1). The contents of physical register R49 (linked to logical register R31) are then used by instruction (2). Instruction ADD3 then places the results of the addition of registers R2 and R3 into logical register R31 (physical register R49). Thus, instruction (3) places a new value in logical register R31 such that one of the conditions for deallocation is met. Further, since there is no previous unexecuted instruction that was using the value originally stored by instruction (1), physical register R49 is deallocated and returned to freelist 144. Also referring to instruction (3), mapper 140 will allocate a new register (for example R48) from register pool 130 and assign it as the destination register for the results of this ADD instruction. In this manner, physical registers in register pool 130 are allocated and deallocated by mapper 140 such that register renaming is implemented. Of course, only a very basic example has been provided to aid in the understanding of register renaming as used in a modern microprocessor. In reality each of the instructions (2) and (3) will also have an assigned physical rename register from freelist 144, and the number and types of instructions will be very complex and diverse. Further, while the present invention is being described in the context of a general purpose register file, it should be understood that the scope of the present invention contemplates use in a floating point register file, condition register file or any set of physical registers which are mapped to logical registers.

As can be seen from the previous discussion, register renaming is a mechanism which tracks the usage of various physical registers and maps this usage to a logical, or architected register that is recognized by the software. In accordance with the present invention, the register renaming logic is modified to prevent any physical registers in the microprocessor from being used which test bad during manufacturing testing, POST and/or BIST. More particularly, the register set 130 shown in FIG. 4 includes 50 (R0–R49) physical registers. At a given time any of these physical registers could be used as an architected register or a rename register depending on its designation by allocation logic in mapper 140.

Returning to FIG. 3, the operation of the present invention will now be described. In a preferred embodiment, fuses 152 in fuse block 150 will be used as the mechanism to build bit vector 142. Once a particular lot of microprocessors 11 is fabricated they will undergo testing to determine whether the functional units included therein are operating normally. As noted above, with the smaller line geometries (e.g. 0.18 and 0.13 micron line widths) the yield may be lower than needed to economically manufacture the processor. Therefore, the critical elements, such as register file 130 are tested to ensure they will accurately store the desired binary values. If it is determined that any one of the registers in file 130 are bad, a corresponding fuse 152 is blown and an associated bit is set in scannable latch 154. The information in latch 154 is then used to build bit vector 142. For example, it can be seen from FIG. 4 that, for the purpose of this example, registers R5 and R30 are noted as having tested bad and a corresponding indicator, such as a bit in vector 142 is set to logical 1. FIG. 3 shows how bit vector 142 is input to mapper 140 and a mapping table included therein is updated. Those skilled in the art will understand how a table, or other mechanism, can be used to relate, or link a physical register location to a bit field, or the like that indicates whether the physical register is "good". Further, it will be understood that this table can also link the physical register address with a logical address that is recognized by software to allow the information to be accessed consistent with the program being run. Returning to the present example, by updating the mapper with the bit vector, the present invention ensures that registers R5 and R30 will never be assigned as the destination (rename) register of an instruction being processed in the dispatch stage. This allows redundant, or spare registers to be provided which can be used in place of the defective registers R5 and R30. For example, a base line microprocessor specification may require 44 general purpose registers (including both logical and rename) for the system to meet its design criteria. Thus, from FIG. 4, mapper 140 could substitute registers R48 and R49 for R5 and R30 to provide the appropriate number of actual physical registers needed to meet the system specification. Also, bit vector 142 is input to mapper 140 only once such that only "good" registers are assigned to instructions in the dispatch stage and there is no increased cycle time in the critical path of the microprocessor. For example, an AND instruction performs a logical AND operation between the contents of two registers and places the result in a destination register. If the instruction, i.e. AND R5<R0, R1 attempts to use a register (R5) that tested bad, the mapper will recognize this fact and assign a functional register, such as spare register R48, to this instruction by use of the mapping table. In this manner, the use of redundant registers in register file 130 is transparent to the microprocessor and will have no detrimental effect on cycle time. It should be noted that mapper 140 will use the next available register from freelist 144, which is not required to be one of the spare registers included beyond the microprocessor baseline specification. That is, mapper 140 treats register file 130 as a contiguous set of physical registers without affirmatively designating various ones of the registers as either architected or rename registers.

In accordance with the present invention, once mapper 140 is updated with bit vector 142, there will be no additional decode operations required to ensure that only good registers are assigned to the instructions being dispatched. Therefore, no increased cycle time is associated with use of the present invention. That is, in a preferred embodiment of the present invention existing rename logic is used by the present invention as a mechanism to track and control the use of registers in register pool 130 of FIG. 4. Thus, renaming is used in a non-conventional manner to prevent those defective registers in register pool 130 that test bad from ever being used. Further, there is no impact on cycle time performance during decode/dispatch since the mapper is updated at initialization with those registers in pool 130 that are defective.

An additional advantage of the present invention is realized in the area of verification and functional testing. It can be seen that bit vector 142 could be generated by test/verification control logic to intentionally label various ones of the registers in file 130 as "bad". Accordingly, the dispatch logic will not use those registers and system operation/performance can be verified with only a predefined number of registers being operational. The bit vector can then be altered to test various register configurations where different ones of the registers in file 130 may be designated as operational or defective. Benchmark tests can then be run to determine system performance when different register configurations are set.

Although certain preferred embodiments have been shown and described, it should be understood that many changes and modifications may be made therein without departing from the scope of the appended claims.

What is claimed is:

1. A data processing system, comprising:
   a microprocessor including a predetermined number of registers for storing information;
   a test mechanism which determines a functional or defective operational status of each of said predetermined number of registers and identifies said registers as having one of said functional or defective operational status by storing said operational status relative to each of said registers in a plurality of indicators corresponding to each of said predetermined number of registers; and
   rename logic that assigns specific ones of said registers, having a particular operational status, to instructions being processed by said micropcessor;

wherein said plurality of indicators comprises a bit vector having a plurality of fields each having one of said plurality of indicators stored therein which correspond to each of said predetermined number of registers; and wherein said test mechanism comprises a set of fuses each corresponding to one of said plurality of fields for causing a value in said plurality of fields to be set in accordance with the operational status of a corresponding one of each of said predetermined number of registers.

2. A data processing system according to claim 1 wherein said specific ones of said registers comprise registers having said functional status.

3. A data processing system according to claim 2 wherein said predetermined number of registers exceeds a base number of registers, having said functional status, used by said microprocessor.

4. A data processing system according to claim 3 wherein said predetermined number of registers less a number of said registers having said defective status is greater than or equal to said base number of registers.

5. A method for providing redundant registers in a microprocessor of a data processing system, comprising the steps of:

providing a microprocessor including a predetermined number of registers for storing information;

identifying each of said predetermined number of registers as having a functional or defective operational status by testing each of said registers to determine a corresponding said operational status;

storing by a plurality of indicators corresponding to each of said predetermined number of registers said operational status relative to each of said predetermined number of registers;

generating a bit vector having a plurality of fields each having one of said plurality of indicators stored therein which correspond to each of said predetermined number of registers;

providing said plurality of indicators to rename logic;

assigning, by said rename logic in said microprocessor, specific ones of said registers, having a particular operational status, to instructions being processed by said microprocessor; and activating at least one fuse, which corresponds to one of said plurality of fields, to cause a value in said plurality of fields to be set in accordance with the operational status of a corresponding one of each of said predetermined number of registers.

6. A method according to claim 5 wherein said specific ones of said registers comprise registers having said functional status.

7. A method according to claim 6 wherein said predetermined number of registers exceeds a base number of registers, having said functional status, used by said microprocessor.

8. A method according to claim 7 wherein said predetermined number of registers less a number of said registers having said defective status is greater than or equal to said base number of registers.

9. A microprocessor having redundant registers, comprising:

a predetermined number of registers, including said redundant registers, for storing information to be used by said microprocessor;

a test mechanism which determines an operational status of each of said registers and identifies each of said predetermined number of registers as having a functional or defective operational status;

a plurality of indicators, corresponding to each of said predetermined number of registers, that stores said operational status relative to each of said registers; and rename logic that assigns specific ones of said predetermined number of registers, having a particular operational status, to instructions being processed by said microprocessor;

wherein said plurality of indicators comprises a bit vector having a plurality of fields each having one of said plurality of indicators stored therein which correspond to each of said predetermined number of registers; and wherein said test mechanism includes a set of fuses each corresponding to one of said plurality of fields for causing a value in said plurality of fields to be set in accordance with the operational status of a corresponding one of each of said predetermined number of registers.

10. A microprocessor according to claim 9 wherein said rename logic comprises allocation logic for assigning said redundant registers having a functional status to said instructions, and for preventing the assignment of any other of said predetermined registers having a defective status.

11. A data processing system, comprising:

a microprocessor including a predetermined number of registers for storing information;

a test mechanism which determines a functional or defective operational status of each of said predetermined number of registers;

a bit vector having a plurality of fields corresponding to each of said predetermined number of registers, each of said fields having an indicator representative of said operational status relative to each of said predetermined number of registers; and rename logic that receives said bit vector and assigns specific ones of said predetermined number of registers, having a functional operational status, to instructions being processed by said microprocessor;

wherein said predetermined number of registers includes redundant registers such that a sufficient number of registers having a functional operational status will be available for assignment to said instructions by said rename logic when a portion of said predetermined number of registers have a defective operational status; and wherein said test mechanism activates fuses corresponding to one of said plurality of fields and causes said indicator value in said plurality of fields to be set in accordance with the operational status of a corresponding one of said predetermined number of registers.

12. A data processing system, comprising:

a microprocessor including a predetermined number of registers for storing information;

means for identifying an operational status of each of said predetermined number of registers including a plurality of indicators and a bit vector having a plurality of fields each having one of said plurality of indicators stored therein, said indicators corresponding to each of said predetermined number of registers and store said operational status relative to each of said predetermined number of registers, said means for identifying having a set of fuses each corresponding to one of said plurality of fields for causing a value in said plurality of fields to be set in accordance with the operational status of a corresponding one of each of said predetermined number of registers; and rename logic that assigns, based on said plurality of indicators, specific ones of said registers having a particular operational status to instructions being processed by said microprocessor.

13. A data processing system according to claim 12 wherein said operational status comprises one of a functional status and a defective status.

14. A data processing system according to claim 13 wherein said specific ones of said registers comprise registers having said functional status.

15. A data processing system according to claim 14 wherein said predetermined number of registers exceeds a base number of registers, having said functional status, used by said microprocessor.

16. A data processing system according to claim 15 wherein said predetermined number of registers less a number of said registers having said defective status is greater than or equal to said base number of registers.

17. A method for providing redundant registers in a microprocessor of a data processing system, comprising the steps of:

providing a microprocessor including a predetermined number of registers for storing information;

identifying an operational status of each of said predetermined number of registers and storing a plurality of indicators, corresponding to each of said predetermined number of registers, in a one of a plurality of fields included in a bit vector, each said field corresponding to one of said predetermined number of registers, said step of identifying includes activating at least one fuse corresponding to one of said plurality of fields to cause a value in said plurality of fields to be set in accordance with the operational status of a corresponding one of each of said predetermined registers; and assigning, based on said plurality of indicators, by rename logic in said microprocessor specific ones of said registers having a particular operational status to instructions being processed by said microprocessor.

18. A method according to claim 17 wherein said operational status comprises one of a functional status and a defective status.

19. A method according to claim 18 wherein said specific ones of said registers comprise registers having said functional status.

20. A method according to claim 19 wherein said predetermined number of registers exceeds a base number of registers, having said functional status, used by said microprocessor.

21. A method according to claim 20 wherein said predetermined number of registers less a number of said registers having said defective status is greater than or equal to said base number of registers.

22. A microprocessor having redundant registers, comprising:

a predetermined number of registers, including said redundant registers, for storing information to be used by said microprocessor;

means for identifying an operational status of each of said predetermined number of registers including a test mechanism which determines said operational status of each of said plurality of registers and a plurality of indicators, corresponding to each of said predetermined number of registers, for storing said operational status relative to each of said predetermined number of registers; and rename logic that assigns, based on said plurality of indicators, specific ones of said predetermined number of registers, having a particular operational status, to instructions being processed by said microprocessor;

wherein said means for identifying further comprises a set of fuses, each corresponding to one of a plurality of fields in a bit vector, that cause a value in at least one of said plurality of fields to be set in accordance with the operational status of a corresponding one of each of said predetermined number of registers.

23. A data processing system, comprising:

a microprocessor including a predetermined number of registers for storing information;

a test mechanism which determines an operational status of each of said predetermined number of registers;

a bit vector having a plurality of fields corresponding to each of said predetermined number of registers, each of said fields having an indicator representative of said operational status relative to each of said predetermined number of registers; and rename logic that receives said bit vector and assigns specific ones of said predetermined number of registers, having a functional operational status, to instructions being processed by said microprocessor;

wherein said test mechanism activates fuses corresponding to one of said plurality of fields and causes said indicator in said plurality of fields to be set in accordance with the functional or defective operational status of a corresponding one of said predetermined number of registers; and wherein said predetermined number of registers includes redundant registers such that a sufficient number of registers having a functional operational status will be available for assignment to said instructions by said rename logic when a portion of said predetermined number of registers have a defective operational status.

* * * * *

UNITED STATES PATENT AND TRADEMARK OFFICE
CERTIFICATE OF CORRECTION

PATENT NO. : 6,748,519 B1
DATED : June 8, 2004
INVENTOR(S) : Moore

It is certified that error appears in the above-identified patent and that said Letters Patent is hereby corrected as shown below:

Column 2,
Line 13, after "location" please insert -- , --;
Line 15, please delete "ray" and insert -- may --;

Column 12,
Line 67, please delete "micropcessor" and insert -- microprocessor --.

Signed and Sealed this

Twenty-eighth Day of December, 2004

JON W. DUDAS
*Director of the United States Patent and Trademark Office*